United States Patent [19]
Thompson et al.

[11] 3,789,733
[45] Feb. 5, 1974

[54] KEYWAY CUTTING AND MILLING MACHINE

[75] Inventors: Lee E. Thompson; William W. Ramsey, both of Tulsa, Okla.

[73] Assignee: Ramsey Winch Co., Tulsa, Okla.

[22] Filed: Nov. 7, 1972

[21] Appl. No.: 304,334

Related U.S. Application Data

[63] Continuation-in-part of Ser. No. 139,503, May 5, 1971, abandoned.

[52] U.S. Cl............................ 90/14, 90/16, 90/21.5, 90/DIG. 13
[51] Int. Cl............................................. B23c 3/30
[58] Field of Search..... 90/14, 16, 12 B, 21 R, 21.5, 90/11 R, DIG. 13

[56] References Cited
UNITED STATES PATENTS

| | | | |
|---|---|---|---|
| 3,117,492 | 1/1964 | Muller | 90/16 X |
| 2,605,678 | 8/1952 | Armitage et al. | 90/16 |
| 2,464,297 | 3/1949 | Ertl | 90/16 X |

Primary Examiner—Gil Weidenfeld
Attorney, Agent, or Firm—Ralph E. Zimmerman

[57] ABSTRACT

A new and improved automatic Keyway Cutting and Milling Machine for cutting one or more keyways in stock material simultaneously, the said machine being electrically programmed to clamp the movement of stock material being processed and to automatically control the operation of the hydraulic system which operates the milling head assemblies, the said milling head assemblies and the clamping of material being all coordinated to work as a unit.

5 Claims, 7 Drawing Figures

PATENTED FEB 5 1974

INVENTOR.
LEE E. THOMPSON
WILLIAM W. RAMSEY

BY R. Zimmerman

ATTORNEY

Fig. 3A.

INVENTORS.
LEE E. THOMPSON
WILLIAM W. RAMSEY

BY
ATTORNEY

KEYWAY CUTTING AND MILLING MACHINE

This is a continuation in part of application Ser. No. 139,503 filed in the U.S. Pat. Office on May 5, 1971 now abandoned.

BACKGROUND OF INVENTION

The present method of preparing keyways in round stock material is to manually set up the stock in a holding device using conventional milling in the stock material. This is a long slow and tedious process with questionable dimensional accuracy. The new Keyway Cutting and Milling Machine which we have invented is to replace the present method of machining keyways in round stock, enhance the accuracy of dimension of the keyways and increase the production during a given number of man hours.

OBJECTS OF THE INVENTION

The object of this invention is to provide an electrically programmed machine for cutting keyways in stock materials.

Another object of this invention is to provide an electrically controlled machine program to operate automatically through a controlled hydraulic system to a selected pattern of operation in a cutting and milling operation.

Still another object of this invention is to disclose a system of electrical controls so that the machine will function with exact preciseness to cut keyways in a set pattern.

FIG. 3-A is a circuit drawing showing the electrical circuitry which controls the automatic operation of the keyway cutting and milling machine;

FIG. 3-B is a circuit drawing showing the electrical circuitry controlling the hydraulic system of the keyways cutting and milling machine and the electrical circuitry for the electrical motors used in operating the automatic keyway cutting and milling machine;

Figure 1:
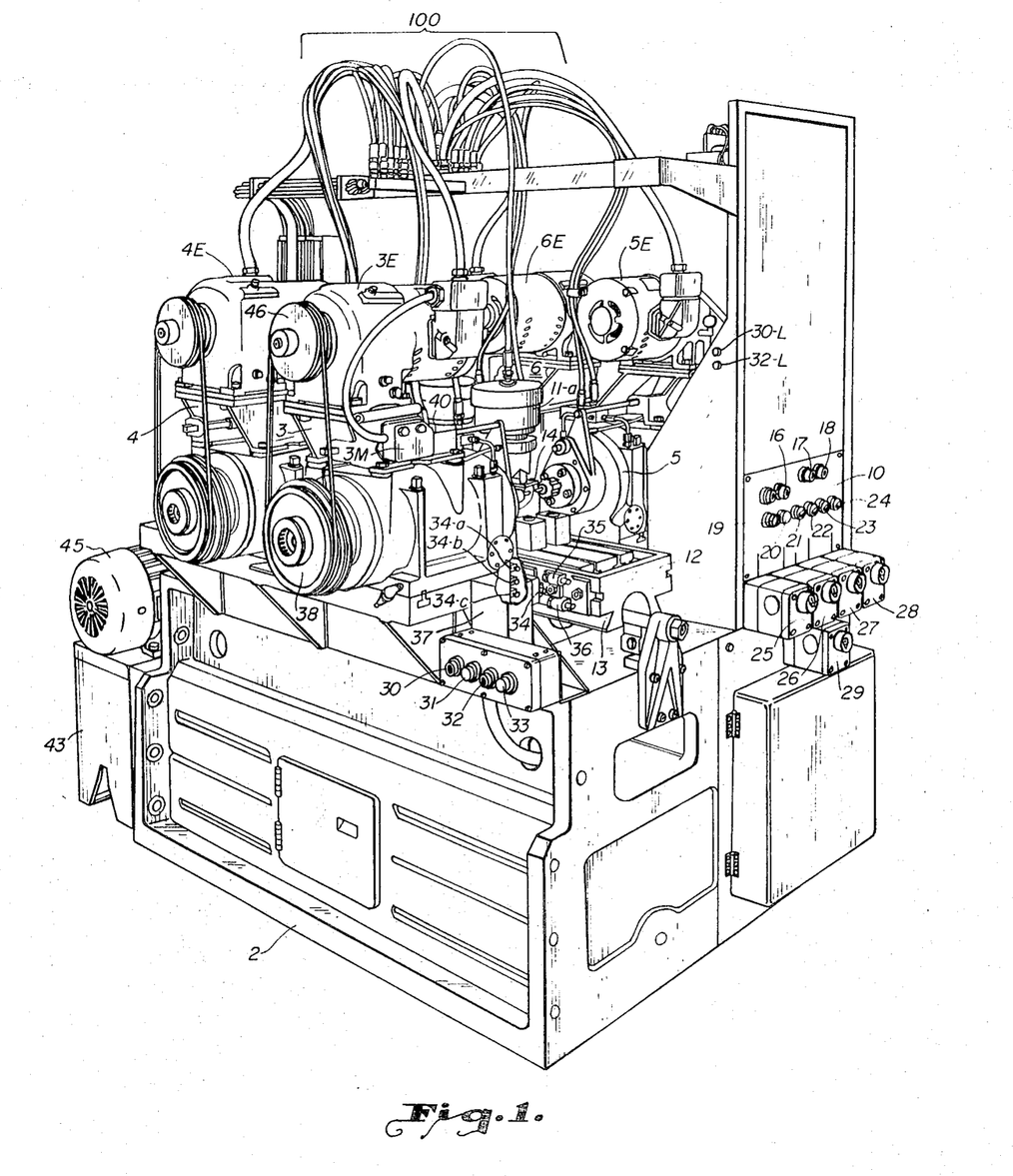
FIG. 1 is a isometric drawing showing the front view of the keyway cutting and milling machine.
Figure 2:
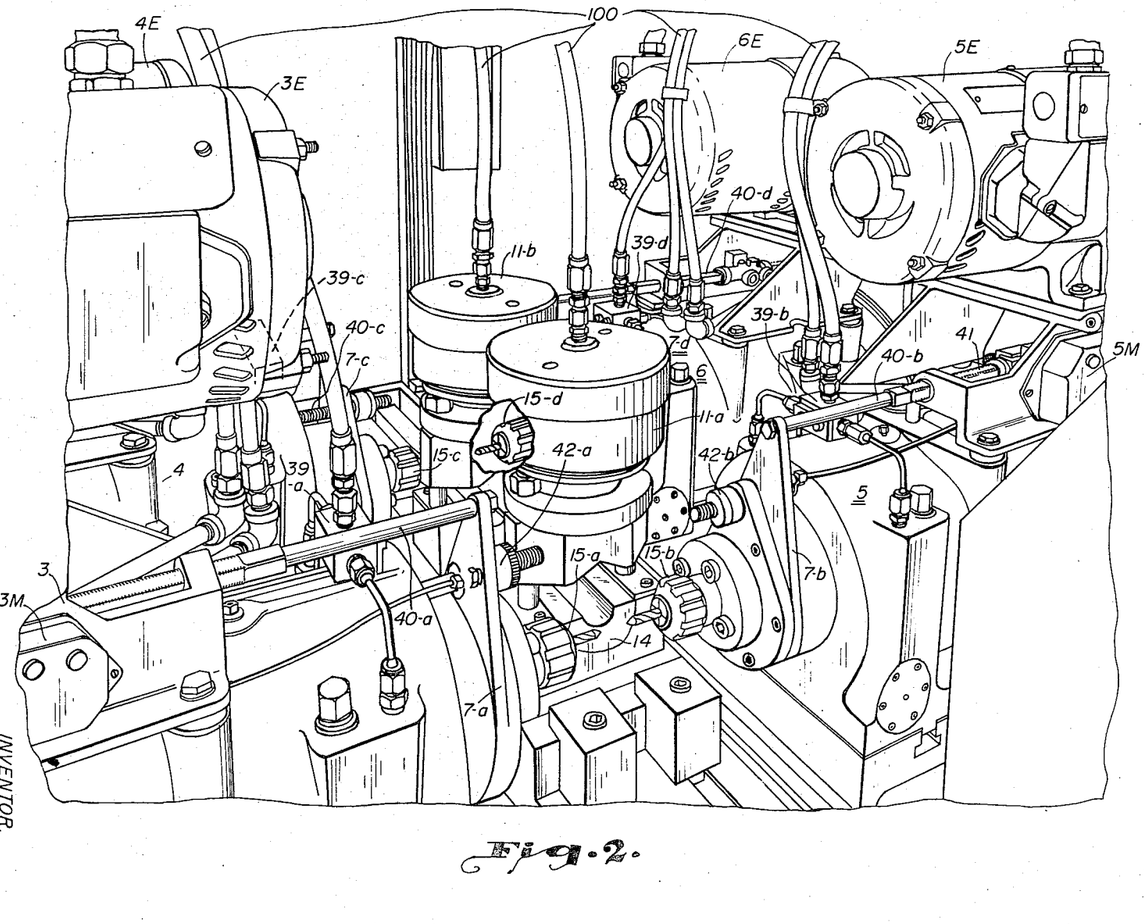
FIG. 2 is a isometric drawing showing the top view of the keyway cutting and milling machine.
Figure 4:
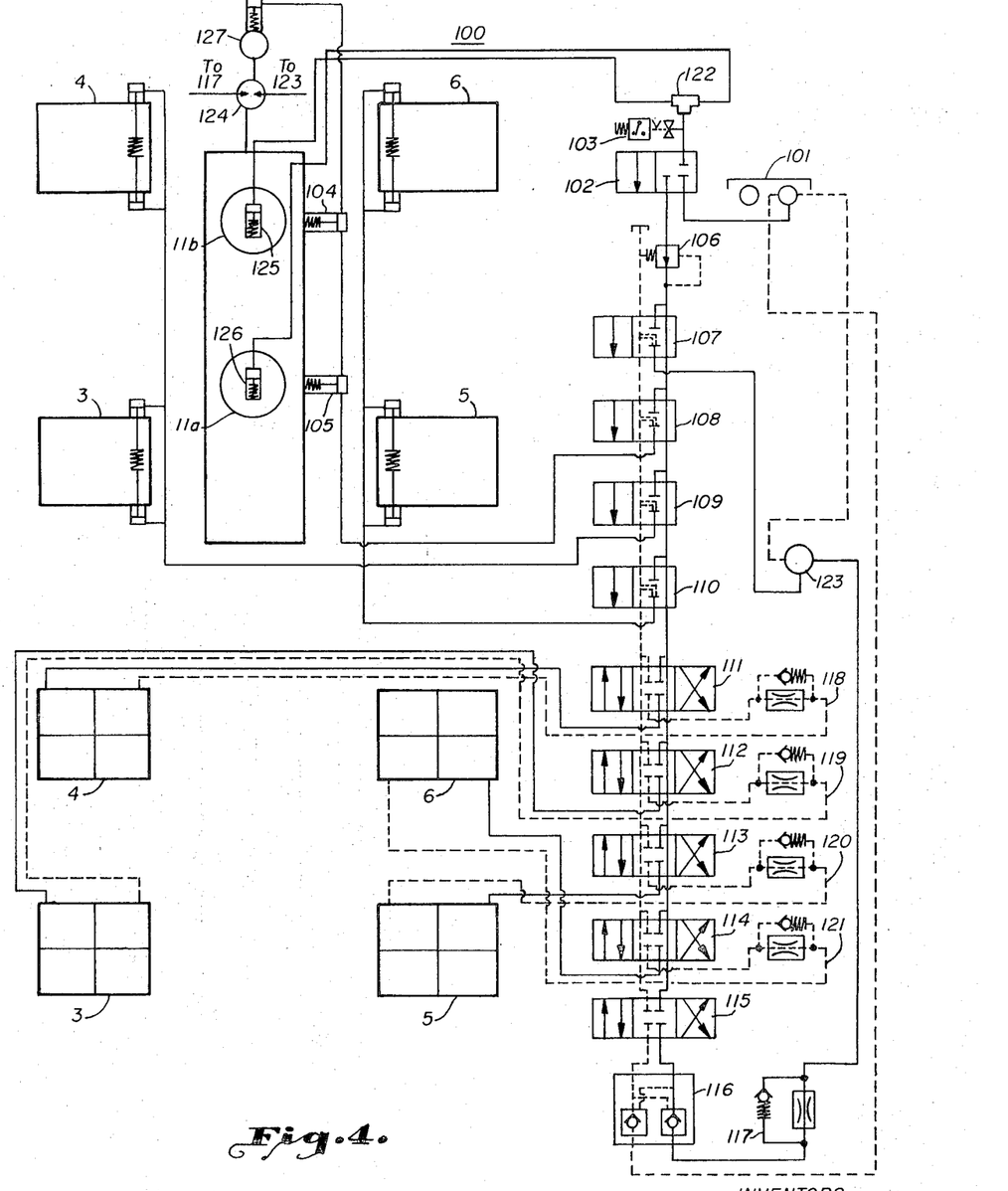
FIG. 4 is a schematic drawing showing the hydraulic circuit of the keyway cutting and milling machine.

Reference is made to FIG. 1 which shows the front view of the keyway cutting and milling machine. The base of the machine is shown as 2. The control switch panel is shown as 10. In the control switch panel 10, moving from left to right, in the top row, are cycle start button 1; hydraulic start button 16. Control buttons 17 and 18 are for manual operation of clamping devices 11a and b, FIG. 2 are shown. Clamping devices 11a and b are vertically mounted, bolted, and supported on table 12 (See FIG. 2). Control buttons 17 and 18 for manual operation of clamping devices 11a and b, FIG. 2 are shown. Control button 17 manually moves the clamping devices 11a and b into clamping position and control button 18 moves the clamping devices 11a and b into an unclamping position. Moving to the second row of control buttons, button 19 is an emergency stop button which retracts spindle-quill 7a,b,c and d, FIG. 2, backwardly to the starting position. Pressing button 20 completely shuts off the automatic keyway cutting and milling machine. Switches 21,22, 23 and 24 are the "off" and "on" switches for individual operational selection of each of the singular movement of each of the switches 21,22,23 and 24 to the "on" position will automatically put that particular spindle into the operation. Moving down the panel 10 is shown five pre set hydraulic control valves 25,26,27,28 and 29. The four hydraulic control valves 25,26,27 and 28 control the speed of the hydraulic fluid which moves spindle-quill 7a,b,c and d into and out of cutting position. The hydraulic control button 29 controls the flow rate of the hydraulic fluid to the working table 12. Hydraulic fluid is supplied through feed line to hydraulic motor 124 FIG. 6, one line 124a drives the hydraulic motor 124 in a clockwise direction while the other line 124b drives the motor in a counterclockwise direction, the third line 129 shown in the hydraulic motor 124 is a bleed line. FIG. 127 is a hydraulic brake which is actuated by hydraulic fluid entering through line 127a. When the stop button 20 is pressed, the movement of the table is stopped by the action of hydraulic brake 127 FIG. 6 and table clamps 104 and 105 FIG. 4. The hydraulic fluid in the system 100 FIG. 4 is supplied from tank 43 by motor 45 FIG. 1 and FIG. 6. Lights 30-L and 32-L, FIG. 1 are used when setting up the travel distance of table 12 and to adjust the microswitch actuating means 35 and 36, FIG. 1 attached to the side of the work table 12. Worktable 12 is supported on slide 13. The microswitch actuating means 35 and 36 move with the table in a forward and rearward direction which depresses the appropriate microswitch 34a,b or c in microswitch box 37 to control the movement of table 12. When adjusting the microswitch actuating means controlling the forward movement of the table, light 30-L will light only when the microswitch is in a depressed position. When the microswitch controlling the movement of work table 12 in reverse is depressed, light 32-L will light. In manual operation, button 30 actuates the movement of the table 12 in a forward direction, and button 31 actuates the reverse travel of the work table 12; button 32 actuates the travel of all spindle-quills 7a,b,c and d, FIG. 2 moving inwardly to a working position in the setting up operation; and button 33 actuates the movement of the spindle-quills 7a,b,c and d, FIG. 2 in a reverse direction back to the starting position in the setting up operation.

Two electrical set-up lights are also provided for indicating the forward and the end travel position of the spindle cutting head 15 a and are shown mounted on box 3M. Box 3M which contains two microswitches are shown as HLS 1 and 5, FIG. 3-A. Microswitch HLS-5 must be in a depressed position before electrical power flows to the solenoid TVF-1, FIG. 3-A which controls the operation of valve 115, FIG. 4 which in turn regulates hydraulic fluid flowing to hydraulic motor 124, FIG. 6 for moving table 12, FIG. 1 in a forwardly and rearwardly direction. In like manner each of the other milling head assemblies 4,5 and 6 have a electrical set-up lights similar to the lights on box 3M with microswitches therein connected to the said lights which indicate the forward and end travel position of the spindle cutting head 15a in set-up operation.

Figure 3A:
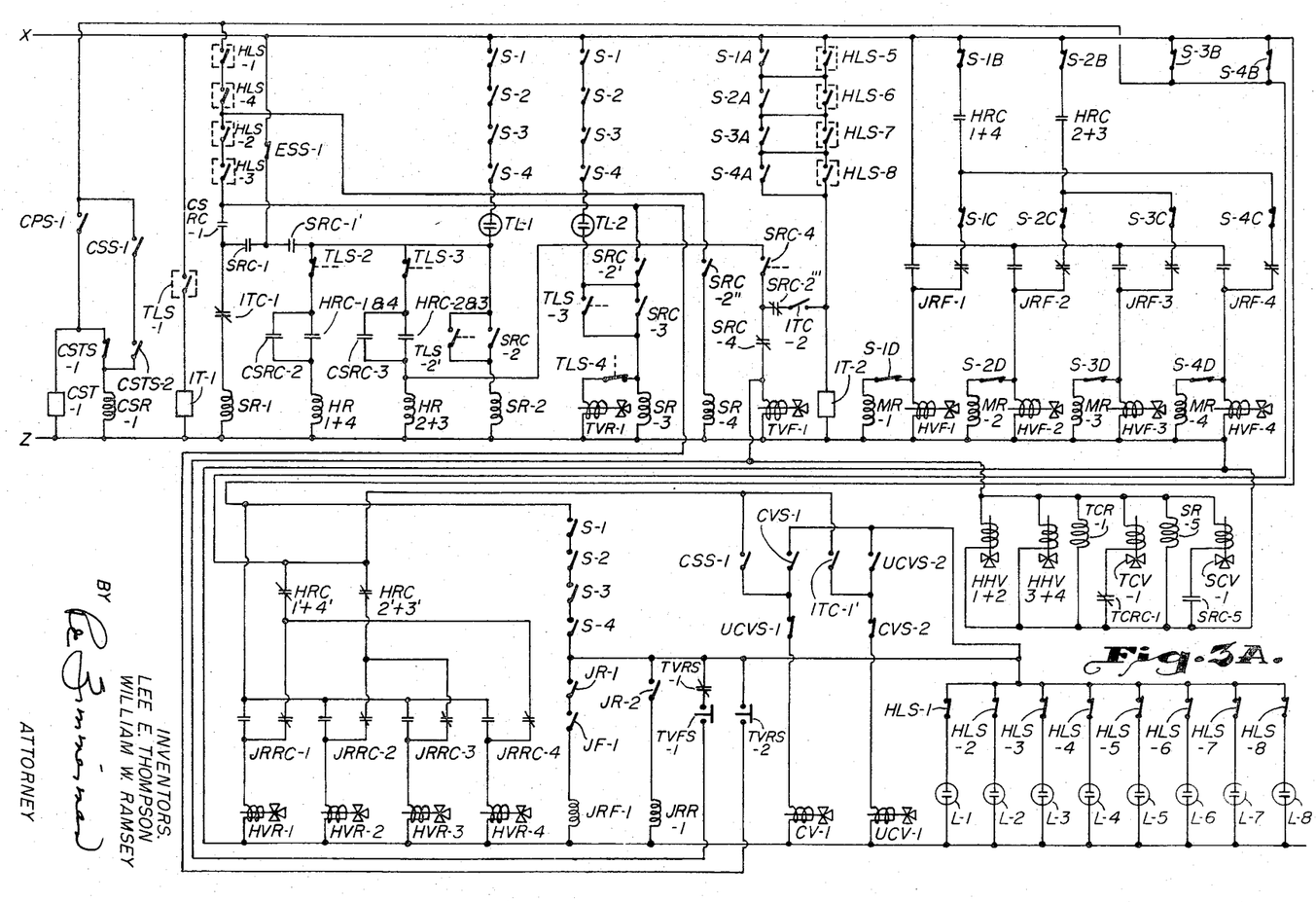

All of the hydraulic milling head assemblies 3,4,5 and 6 are similar. The hydraulic milling assembly 3 which shall be used as an example consists of a spindle-quill 7a and electric driving motor 3E. Rotating power to cutting head 15 a in the hydraulic ram 5 is supplied by the electric motor 3E through a V-belt drive 38, FIG. 1. In a similar manner each of the other milling head assemblies 4,5 and 6, FIG. 2 are equipped with electric motor driving means 4E, 5E and 6E. The remaining milling head 4,5 and 6 are assembled in a manner similar to milling head 3. The operation of all the milling head assemblies are electrically controlled by the electrical panel 10, the operation of which shall be explained later by reference to FIG. 3A and 3B. The operation of milling heads 3,4,5 and 6 are electrically synchronized to work as a unit, the mode of operation being programmed through an electrical system as shown in FIG. 3A and 3B to operate a system of microswitches, hydraulic valves, relays and indicator lights, each of which shall be explained when referring to FIG. 3A, 3B, 4 and in the procedure for setting up the keyway cutting and milling machine.

Reference is made to FIG. 2 which shows a top view of the keyway cutting and milling machine 1, FIG. 1. FIG. 2 portrays the work table 12 which is movably mounted on ways 13, which are part of the base 2, FIG. 1. Work table 12 is shown equipped with a circular cradle 14; however, any suitable fixture or holding device which provides a means to position any workable stock in which keyways or other types of fabrication to be performed can be substituted for the circular cradle 14 shown. Referring to circular cradle 14, the stock is held tightly in position by clamping devices 11a and 11b which are actuated downwardly by hydraulic means into position to hold the stock. The movement of clamping devices 11a and 11b is timed in accordance with the sequence of electrical operational control of the keyway machine 1 which shall be explained later when referring to FIG. 3A and 3B.

Figure 5:
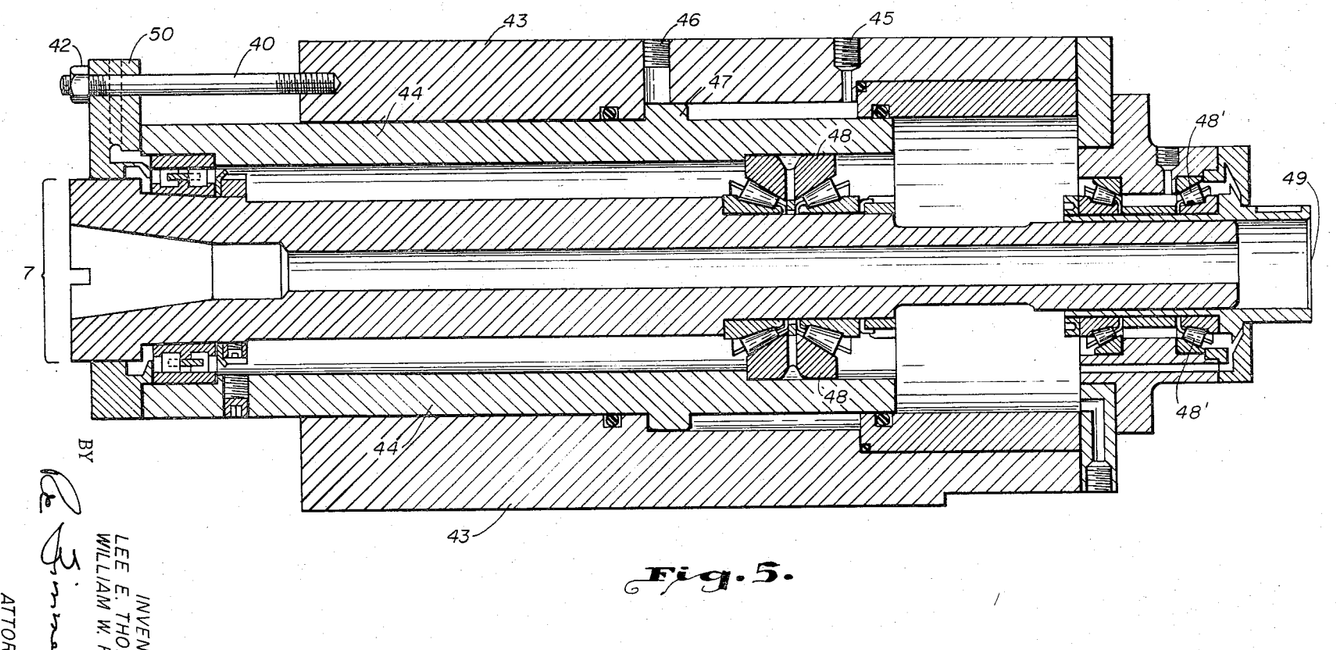
FIG. 5 is a sectional drawing of a milling head assembly used in the assemblied machine.
Figure 5B:
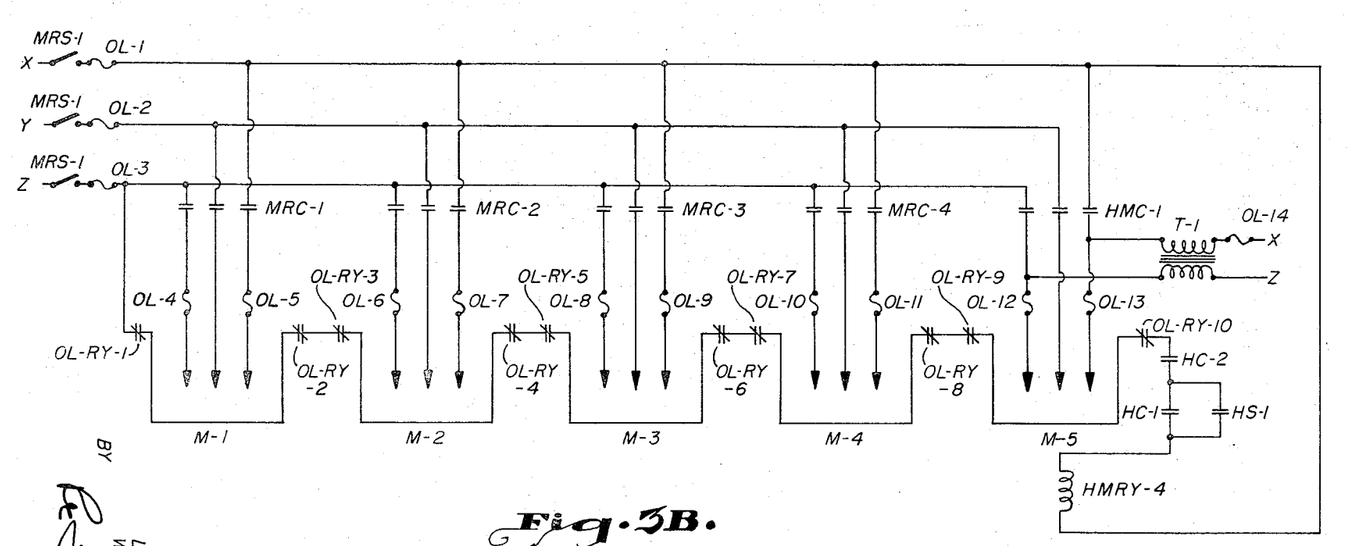

Hydraulic fluid for actuating the movement of the hydraulic clamping devices 11a and 11b is fed from the hydraulic distribution system 100 which will be fully explained when referring to FIG. 4 through the top of the clamping devices 11a and 11b. The clamping devices 11a and 11b are structured so as to act as hydraulic rams which move downwardly when the hydraulic fluid enters the top of the devices 11a and 11b. Hydraulic fluid also passes through receiving blocks 39a,b,c and d, FIG. 2 to lubricate the spindle-quill 7–44, FIG. 5 and into the hydraulic ram as shown in FIG. 5 to move the spindle-quill 7–44, FIG. 5 in an axially movement in the direction of the feed axis. The movement of the spindle-quill 7–44, FIG. 5 is limited by travel control rods 40a, b, c and d attached thereto. The movement of the travel control rods 40a,b,c and d has means attached thereto to depress either of two microswitches (not shown) but located for example in micro-box 3M, FIG. 1 attached to mill head assembly 3. Microswitches are also mounted in a similar manner on mill head assemblies 4,5 and 6, FIG. 2. For example, the purpose of the first microswitch in box 3M is to actuate solenoid table valve forward TVF-1, FIG. 3A which actuates hudraulic pump 124, FIG. 4 to move the table 12, FIG. 2 in a forward directional movement. Control rod 40-a moves backward when the movement of the spindle-quill 7–44, FIG. 5 is reversed. Means on control rod 40-a depresses a second microswitch in box 3M, FIG. 1. Table valve forward TVF-1, FIG. 3A is de-energized and the movement of table 12, FIG. 2 in a forward direction is discontinued. The distance of travel of the control rods 40a,b,c and d attached to spindle-quill 7a,b,c and d respectively is controlled by dial nuts 42a,b,c and d which are attached to the end of control rods 40a,b,c and d. The dial nuts 42a,b,c and d are manually adjustable to gauge the distance spindle-quill 7a,b,c and d will travel. Accordingly, the amount of travel of spindle-quill 7a,b,c and d determine the depth of cutting in the stock being processed. In setting the distance of travel of control rods 40a,b,c and d, the first microswitch of two microswitches in box 3M must be synchronized with adjustment of dial nut 42a,b,c and d so that the first microswitch in box 3M will be depressed when the spindles 7a,b,c and d reach the cutting position.

When the proper depth is reached, the cutting heads 15a,b,c and d proceed automatically cutting as the table 12 FIG. 2 moves in an axial direction until the cutting operation is complete. When the keyways are complete, the travel of the spindle-quill 7a,b,c and d stops, is reversed and retracts to the starting position.

THE ELECTRICAL CONTROL SYSTEM

Reference is made to FIG. 3-A and FIG. 3-B which illustrates schematic line drawings of the electrical circuitry required to automatically operate the automatic keyway cutter and milling machine. The source of power (110–120 VAC) to the electrical circuitry is shown as X and Z in FIG. 3-A. Reference is made to FIG. 3-B. HS-1 is shown as the electrical start button for the electrohydraulic system in this machine, FIG. 4. The operation of the hydraulic system will be fully explained in a later paragraph by referring to FIG. 4. To furnish power to operate the electric motor M-1,2,3,4 and 5, FIG. 3-B, manual switch MRS-1, FIG. 3-B is closed, putting power (220 volts) in lines X,Y, and Z to run the three phase motors M-1, M-2, M-3, M-4 and M-5. Overload limit switches are shown as OL 1–14 in FIG. 3-B, overload relays are shown as OLRY 1–10. These are for safety reasons to shut down operation of the motors M 1–5. The operation of the complete automatic key-way cutting and milling machine including the motors is controlled by an electrical control system schematically shown in FIG. 3-A. To furnish power to the electrical control system, three phase power is transformed in transformer T-1 and is converted to single phase 110–120 VAC to operate the control equipment as shown in FIG. 3-A. The electrically driven hydraulic motor M-5 is started by pressing start button HS-1 (normally open) which locks in contact HC-1. Hydraulic motor relay HMRY-4, FIG. 3-B closes contact HC-2 to start the electric motor M-5 which drives hydraulic unit 101, FIG. 4.

Reference is made to FIG. 3-A. The position of mechanically operated selector switches S 1,2,3 and 4 shown at three locations in FIG. 3-A remain open when the milling head assembly is set for automatic operation of all four milling heads 3,4,5, and 6, FIG. 1. SIA, 2A, 3A and 4A are shown normally open however, should the operator wish to eliminate any of the milling heads 3,4,5 and 6 the appropriate switch is closed and that particular milling head will not enter into the operation. For instance, should the operator wish to keep milling head 3, FIG. 1 out of operation, switch S–1A is closed and that particular milling head is by passed and remains in a non operating position while the remaining milling heads 4,5, and 6 will enter into the cutting operation. By selectively closing S–1A,-

2A,3A and 4A, the corresponding milling head 3,4,2, and 3, FIG. 1 respectively can be eliminated for that cutting operation. When S–1A is closed, S–1B, C and D open. This is a function of the mechanical switch assembly (not shown) but the knobs controlling these switches are designed as 21,22,23 and 24, FIG. 1. This switch assembly is controlling the movement of power to the milling heads 3,4,5 and 6, FIG. 1 in the milling head assembly, FIG. 1. In like manner selectively closing S–2A, 3A and 4A opens S–2B, C and D; S–3B, C and D; S–4B, C and D respectively and shuts down the operation of the milling head which corresponds to the selected switch. The switches S–1, 2,3 and 4 are also useful in operational set up of the individual milling head. This will be explained in the section explaining the machine set up. To start the balance of automatic keyway cutting and milling machine a cycle start button CSS–1, FIG. 3–A shown at two locations is closed. Clamp solenoid valve CV–1, FIG. 3–A closes and locks in the hydraulic pressure in the hydraulic system which is shown as FIG. 4. The hydraulic pressure builds up to actuate electrical energy to pass to cycle start timer CST–1. The clamp solenoid valve CV–1 also actuates the clamping hydraulic cylinder shown as 125 and 126, FIG. 4 and moves the clamping devices 11a and 11b, FIG. 2 to a closed position. When cycle interval start timer CST–1 is actuated; cycle start timer switch CST–2 (normally open) closes, switch CSTS–1 normally closed remains closed and cycle start relay CSR–1 is momentarily actuated.

When cycle start relay CSR–1 closes momentarily, contacts CSRC–1,2,3 and interval timer contact ITC–1 close, sequence relay SR–1 is energized which in turn closes contacts SRC–1 and 1'.

When cycle start relay switches CSRC–1,2 and 3 close, head relays HR–1 and 4 and HR–2 and 3 are energized, consecutively, contacts HRC–1' and 4', HRC 2' and 3' open deenergizing head valve reverse relays HVR–1,2,3 and 4. Contacts HRC–1 and 4, HRC–2 and 3 normally open, close energizing motor start relays (magnetic) MR–1,2,3 and 4 which close relay contacts MRC–1,2,3 and 4, FIG. 3–B. The motors M–1,2,3 and 4, FIG. 3–B also shown as 3E,4E,5E and 6E, FIG. 1, start running. The motors 3E,4E,5E and 6E, FIG. 2, drive the cutting heads 15a,b,c and d, FIG. 2, attached to spindles 7a,b,c and d by V-belts attached at the rear of assemblies 3,4,5 and 6, FIGS. 1 and 2. At the same time when head relay contacts HRC–1 and 4 and HRC–2 and 3 close, solenoid head valves forward HVF–1,2,3 and 4 are energized and the cutting heads moved into cutting position. Micro head limit switches HLS–5,6,7 and 8 close when spindles 7a,b,c and d are moving into cutting position, micro switches HLS–1,2,3 and 4 close when the spindles 7 a,b,c and d are in the cutting position. Interval Timer IT–2 is energized. When interval timer IT–2 is energized, the circuit remains open long enough to allow cutting heads 15a,b,c and d, FIG. 2 to move inwardly to the cutting position, before contact ITC–2 is close. When interval timer contact ITC–2 closes, solenoid table valve forward TVF–1 is actuated and the table 12, FIG. 1 moves in a forwardly direction at a pre-determined speed. When table valve forward TVF–1 is actuated, head hold valves shown as HHV–1,2 and 3–4 close to actuate two way valves 109 and 110, shown in FIG. 4. To look in cutting heads 15a,b,c and d, FIG. 2; relay TCR–1 is actuated to open table clamp valve relay contact TCRC–1 which releases table clamp valve TCV–1. When TVF–1 operates surge timer SR–5 is actuated. Surge relay contact SRC–5 closes and momentarily operates surge control valve SCV–1 which in turn operates two way valve 107, FIG. 4 to absorb any excess hydraulic pressure to surge control 123, FIG. 4. At this point, the keyway cutting and milling machine begins to cut slots into the stock material.

Because of the unique design of this machine, the length of the keyway slots can be made of varying length in pairs. The length of two pairs of slots are determined independently by a first setting on stop 35 and a second setting on stop 36, FIG. 1, the stops 35 and 36, FIG. 1 are so arranged that for instance, stop 35, FIG. 1, will open microswitches TLS–2, FIG. 3–A first and stop 36, FIG. 1 will open a microswitch TLS–3 second in sequence, both microswitches being located in box 37, FIG. 1. When the microswitch TLS–2 is opened, head relay HR–1 and 4 is de-energized, contact HRC–1 and 4 shown at two positions, open de-energizing solenoid head valves forward HVF–1 and HVF–4, motor relay MR–1 and motor relay MR–4, contacts HRC–1',4' close. Microswitch TLS–2' closes energizing sequence relay SR–2 which in turn closes contacts SRC 2,2',2" and 2"'. The closing of HRC 1',4' again energizes head valve relay reverse HVR–1 and 4. The cutting heads 15 a and b retract and open microswitch HLS–1 and 4. When HLS–1 and 4 opens, power and energized sequence relay SR–4 closes contact SRC–4 again energizing table valve forward, TVF–1. The work table 12 again proceeds forward with microswitch TLS–3 remaining closed until stop 36, FIG. 1 trips microswitch TLS–3 to open circuit and microswitch TLS–3' closes and energizes sequence relay SR–3, contact SRC–3 closes, solenoid table valve reverse TVR–1 is energized. Work table 12, FIG. 1 reverses direction of travel and returns to the starting position. When micro switch TLS–3 opened, head relay HR–2 and 3 was deenergized and head relay contacts HRC–2 and 3 open deenergizing head valve HVF–2 and 3. Sequence relay SR–4 energized table valve forward TVF–1, the table returns to its starting position trips microswitch TLS–4,34 FIG. 1 which stops the work table 12, FIG. 1 movement and trips microswitch TLS–1. Integral timer IT–1 remains open momentarily until all power is discontinued, the keyway cutting and milling machine shuts down.

THE HYDRAULIC CIRCUIT

Reference is made to FIG. 4 which shows a schematic drawing of the closed hydraulic system which operates the automatic keyway cutting machine. The schematic line drawing, FIG. 4 shows the hydraulic system 100 which is the hydraulic means of the automatic control in the keyway cutting machine for moving the cutting heads 15a,b,c and d, FIG. 2 attached to spindles 7a,b,c and d, FIG. 2 in milling assemblies 3,4,5, and 6, FIG. 2 in a forward or a reverse position and for moving the work table 12, FIG. 1 and the clamping device 11a and 11b. The electro-hydraulic pump shown as 101 furnishes hydraulic pressure for the hydraulic system 100. The hydraulic fluid passes from the electro-hydraulic pump 101, FIG. 4, 45, FIG. 1 to the four way clamping valve 102. The pressure in the hydraulic system 100 is regulated by a pressure switch 103 which allows pressure to build in the balance of the system. The hydraulic fluid passes from the four way clamping valve 102 through control valve 103 and through T connector 122 to hydraulic clamping means 11a and 11b, FIG. 2 and FIG. 4. The hydraulic fluid from the four way clamping valve 102 also passes through another exit to a pressure regulated valve 106 to two way valve 107 which controls the hydraulic circuit for the surge control 123. The hydraulic circuit from 107 feeds to the surge control 123. Two way control valve 108 feeds hydraulic fluid to table stop clamps 104 and 105 and the table brake control 127 FIG. 4 also shown in FIG. 6. Two way control valves 109 and 110 control the hydraulic feed and pressure to spindle clamps, 40a, 40c and 40b and 40d FIG. 2 respectively through receiving blocks 39a,c and d FIG. 2. The receiving block in milling head 3 is not shown in FIG. 1.

Figure 6:
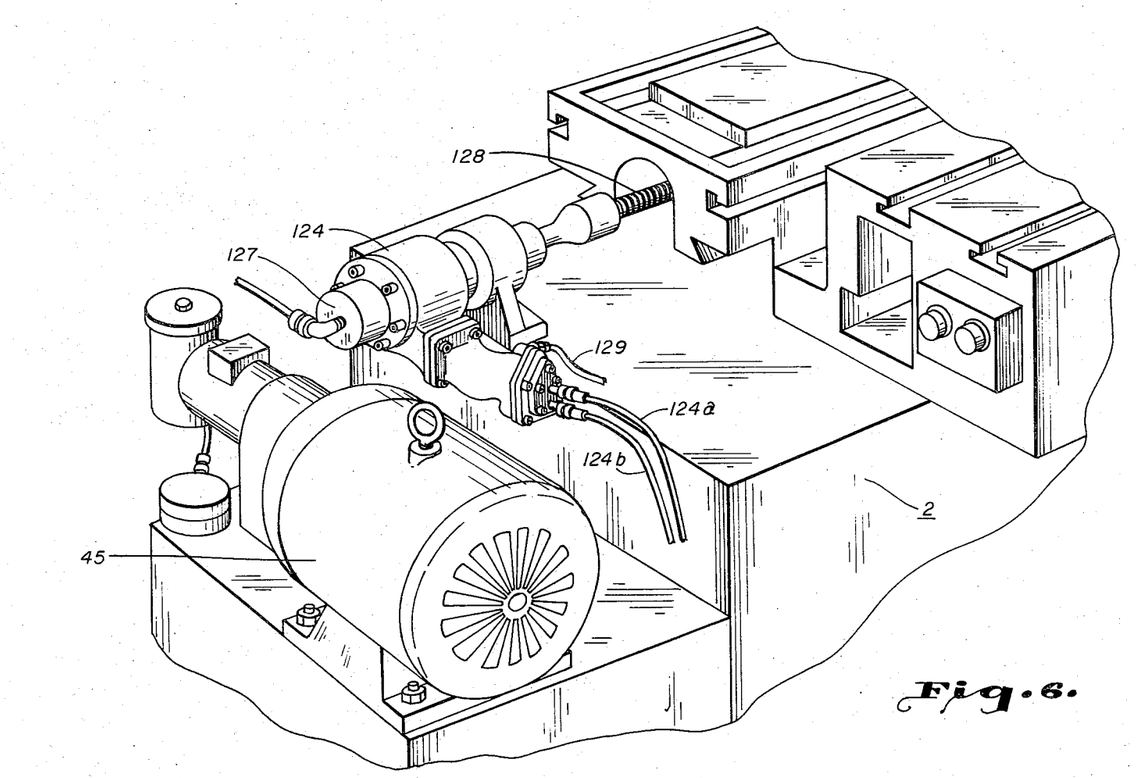
FIG. 6 is a isometric drawing (partial view) portraying the hydraulic equipment for moving the worktable in the keyway cutting and milling machine.

In the lower section of FIG. 4 the hydraulic circuit is further shown. In this section of the hydraulic circuit is a system of four valves 111, 112, 113 and 114. Each of these valves 111, 112, 113 and 114 are four way valves through which the hydraulic fluid enters at a controlled rate to supply the hydraulic rams 3,4,5 and 6, FIG. 2. For instance hydraulic fluid under pressure is fed through hydraulic control valve 111 to hydraulic ram 4 to move spindle-quill 7c, FIG. 2 and returns through check valve 118 to control valve 111 to hydraulic circuit supply tank 43, FIG. 1; in like manner hydraulic fluid under pressure passes through hydraulic control valve 112 to hydraulic ram 3 and returns through check valve 119 and through control valve 112 to hydraulic circuit supply tank 43, FIG. 1; in like manner hydraulic control valve 113 controls the hydraulic fluid flow under pressure to hydraulic ram 5 which returns through check valve 120 to control valve 113 and to the hydraulic circuit supply tank 43, FIG. 1, likewise, the hydraulic fluid under pressure passes through control valve 114 to hydraulic ram 6 which returns through check valve 121 to control valve 114 and to the hydraulic circuit supply tank 43, FIG. 1. Control valve 115 controls the movement of hydraulic fluid to the hydraulic motor as shown in FIG. 6 which moves the worktable which is also equipped with a hydraulic lock 116 for the hydraulic brake 127 FIG. 6 which is useful for holding the table in one position. The hydraulic circuit continues through a check and flow control 117 which controls the hydraulic fluid flow to the hydraulic motor 124 which operates a screw which moves the table 12, FIG. 1. The hydraulic fluid is returned through the control valve 116 to the hydraulic circuit supply tank 43, FIG. 1.

THE SPINDLE-QUILL ASSEMBLY

Reference is made to FIG. 5 which shows a cross sectional view of the spindle-quill assembly 7-44 forming part of hydraulic ram as shown in FIG. 2. This is typical of the hydraulic rams installed in each of the four milling head assemblies 3,4,5 and 6, FIG. 2. Referring to FIG. 5, the hydraulic ram shown therein comprises a housing 43 with a spindle 7 in combination with a quill 44 immediately inside the housing 43. The quill 44 and spindle 7 move in a forward and reverse direction. The movement of the quill 44 within housing 43 is controlled by the directionally flow of the hydraulic fluid fed in through either parts 45 or 46. For instance, the movement of the hydraulic fluid through part 45 acts against piston 47 to move the spindle-quill assembly 7-44 into a forward direction as illustrated in FIG. 5. To retract the spindle-quill assembly 7-44, hydraulic fluid under pressure enters part 46 moving the spindle-quill assembly 7-44 in a reverse direction. Spindle 7, FIG. 5 which is part of the spindle-quill assembly 7-44 supporting cutting heads shown as 15a,b,c and d, FIG. 2 is mounted on rollers 48 and 48' in quill 44 and moves in a forward and reverse direction with the spindle-quill 7-44. FIG. 5 which also moves in a circular direction at a given rate of speed on roller bearings 48 and 48'. The spindle 7, FIG. 5 has a spline connection in a driver 49 which is in combination with pulley 38, FIG. 2 and is electrically driven through a V-belt connected to pulley 38 on motor 3-E, FIG. 1. The speed at which the spindle-quill 7-44 moves forward is determined by the speed at which the hydraulic fluid feeds through part 45 to move the quill 44, forward. The extent of travel of spindle 7 is controlled by stop 50 on rod 40. The travel is adjustable by turning the dial nut 42 on rod 40.

Reference is made to FIG. 6 which portrays the hydraulic motor assembly 124 with screw driving means 128 attached to the hydraulic motor 124. Screw driving means 128 move the working table 12 FIG. 1 in an axially direction the direction of movement being determined by the direction of rotation of the hydraulic motor 124 clockwise or counter clockwise. The direction of rotation of hydraulic motor 124 is determined by the direction of flow of the hydraulic fluid into the hydraulic motor 124. The hydraulic motor 124 rotates in a clockwise and counter clockwise direction depending on the flow of the hydraulic fluid which is controlled by two way control valve 115 through check and by pass valve 117. Surge valve 123 is also connected into the body of the hydraulic motor 124. To assist table stop clamps 104 and 105 FIG. 4, braking means 127 is attached to stop the movement of hydraulic motor 124, which in turn stops the movement of table 12 FIG. 1.

SET-UP PROCEDURE

Reference is made to light control indicator 3-M, FIG. 2 cutting head assembly 3 which is typical of all the light control indicators found in cutting head assemblies 3,4,5 and 6, FIG. 1 and 2. Each of the four light control indicators contain two bulbs per unit shown in the drawing, FIG. 3-A as L 1-8. Switches HLS 5-8, FIG. 3-A close when the cutting heads 15a,b,c and d are in a cutting position. In this position the outboard travel of the spindle 7, FIG. 2 and 5 is controlled by adjusting the travel rod 40 at dial nut position 42, FIG. 2. Each of the milling head assemblies 3,4,5 and 6, FIG. 2 have travel rods similar to the travel rod 40b and a lock nut 42b shown in FIG. 2 located in similar positions. The dial nut 42b which is also typical for cutting head assemblies 4, 5 and 6 is the adjusting means for limit of travel to a cutting position of the milling head assembly 3. The adjustment of this dial nut 42b, FIG. 2 will set the amount of travel of spindle 7b, FIG. 2 when moving in a forward direction to a cutting position, or when retracting from the cutting position.

It will, of course, be understood that various details of construction may be varied through a wide range without departing from the principles of this invention, and it is, therefore, not the purpose to limit the patent granted herein otherwise than nessitated by the disclosure.

We claim:

1. A keyway cutting machine comprising in combination
   a. a base,
      1. having a horizontal movable worktable slidably mounted thereto,
   b. at least one clamping device,
      1. the said clamping device having actuating means so as to move it in a vertical direction, the said clamping device being positioned directly over and attached to the said movable worktable,
   c. at least one milling head assembly including
      1. actuating means to move a spindle axially and in a horizontal direction and
      2. a horizontal positioned milling head rotatably mounted onto the said spindle,
   d. the said keyway machine having means to coordinate the operation of the said worktable, the said clamping device, and the said milling head assembly.

2. The keyway cutting machine as claimed in claim 1 where the said movable table is slidably mounted on a screw, the said movement of the worktable being actuated by the rotation of said screw mounted into a motor.

3. The keyway cutting machine as claimed in claim 2, where the said milling head assembly comprises,
   a. an electric motor mounted on
   b. a housing, the said housing having,
   c. a quill mounted therein and at least one port to admit hydraulic fluid for actuating the said quill,
   d. the said quill having said spindle mounted therein,
      1. the said spindle being rotatably mounted in the said quill,
      2. the said spindle being rotatably driven through V-belt means by the said electric motor,
      3. the said horizontal movement of the said spindle being limited by adjustable means attached to the said housing.

4. The keyway cutting machine as claimed in claim 1 where the said actuating means for the movement of the said clamping device is a hydraulic ram.

5. The keyway machine as claimed in claim 2 wherein the said screw actuating the said worktable is attached to a rotating hydraulic motor, the said hydraulic motor being capable of rotating in a clockwise and counter clockwise direction.

* * * * *